Sept. 29, 1959   D. A. KOHL   2,906,648
MASKING METHOD OF PRODUCING A HUMIDITY SENSOR
Filed Nov. 25, 1955   2 Sheets-Sheet 1
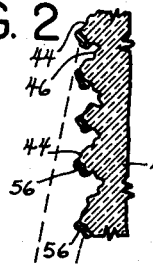
FIG. 2
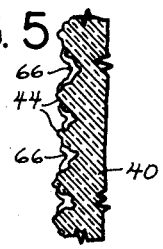
FIG. 5
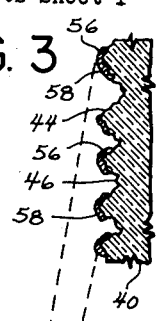
FIG. 3
FIG. 4
FIG. 1
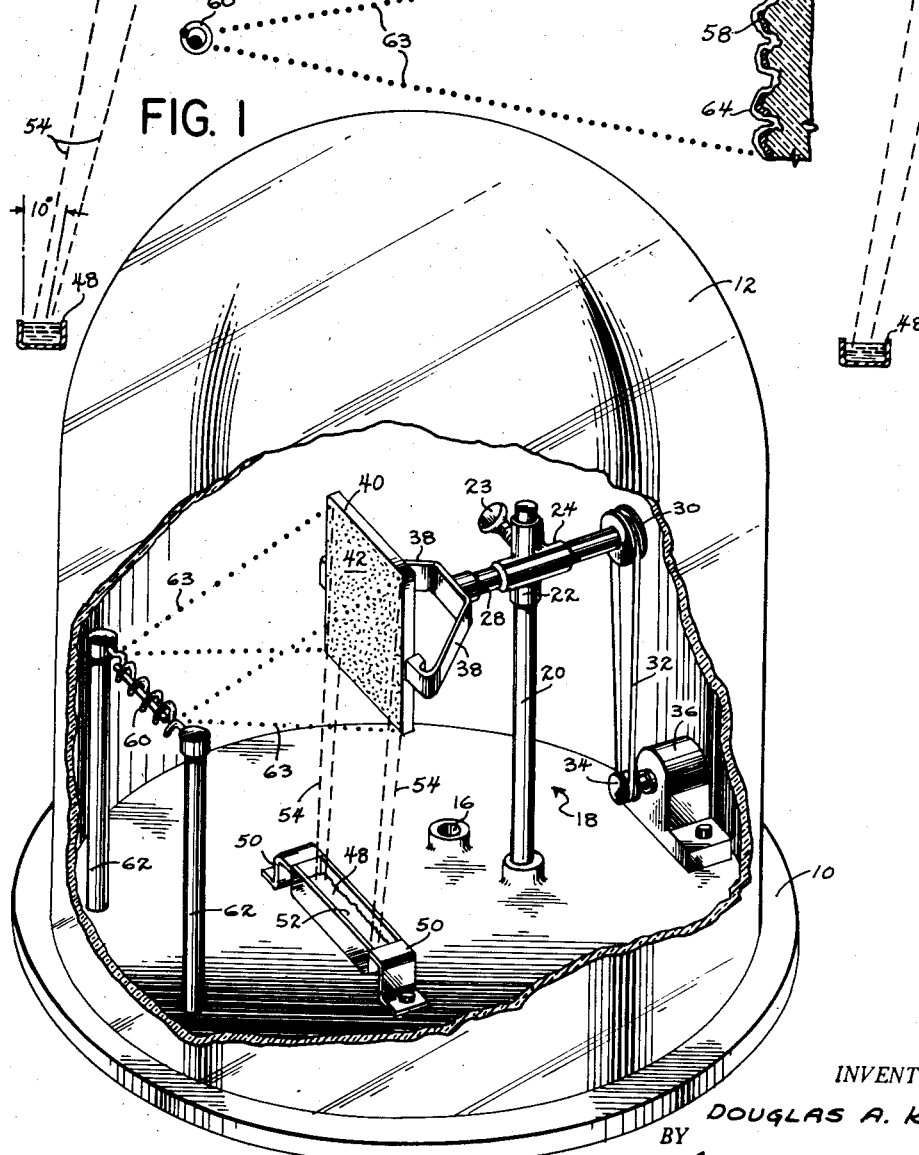
INVENTOR.
DOUGLAS A. KOHL
BY
Stuart R. Peterson
ATTORNEY Sept. 29, 1959  D. A. KOHL  2,906,648
MASKING METHOD OF PRODUCING A HUMIDITY SENSOR
Filed Nov. 25, 1955  2 Sheets-Sheet 2

INVENTOR.
DOUGLAS A. KOHL
BY
Stuart R. Peterson
ATTORNEY

United States Patent Office 2,906,648
Patented Sept. 29, 1959

2,906,648

MASKING METHOD OF PRODUCING A HUMIDITY SENSOR

Douglas A. Kohl, Osseo, Minn., assignor to General Mills, Inc., a corporation of Delaware Application November 25, 1955, Serial No. 549,118

5 Claims. (Cl. 117—211)

This invention relates generally to humidity sensing devices and pertains more particularly to a method of improving the surface characteristics of a humidity sensor of the adsorbing type so as to lessen the time response when composed of certain porous materials. As an aid to understanding better the type of humidity sensor with which the present invention is concerned, it may be explained that the term "adsorbing" is herein defined, in contra-distinction to "absorbing," an encompassing or involving a characteristic in which there is a preferential attraction for water vapor molecules and while said molecules are in contact with the adsorber there is no chemical change and no irreversible action. Absorption, on the other hand, occurs when water vapor molecules are actually combined through chemical reaction with the absorber, incorporated into the molecular structure of the absorber (for instance, water of crystallization), or there is a release of ions by virtue of a binding action such that the conduction of electric current by the ions may result in physical changes. Typical of such absorbing reactions are the swelling of cellulose and the ion-exchange resins.

When adsorbing materials such as unglazed porcelain, fired clay, or porous glass, commonly termed "thirsty" glass, are employed in the making of humidity sensing elements, it sometimes follows that the natural porosity of the materials utilized delays the action because diffusion into the interior makes the surface moisture layer less than the true equilibrium value. More specifically, what occurs is that the various pores assimilate moisture therein to such an extent that when there is a change in the humidity state, the pores do not release promptly the entrained moisture. Until an equalization of conditions has taken place, an accurate reading is not possible.

Accordingly, one object of the invention is to provide a humidity sensor and a method of making such sensor that will modify the surface characteristics of an otherwise rather porous sensing element so that the moisture will not have an opportunity to collect in the pores to the extent that the element is rendered quite slow in its action. This end is accomplished, briefly speaking, by first roughening the porous surface so as to provide a multiplicity of minute peaks or hills, leaving crevices or valleys therebetween. The porous material left in the peaks will have a multiplicity of openings to the surface. By disposing a source of masking material, such as wax, at an acute angle with the plane of the roughened surface, evaporation of this wax is directed toward the adsorbing element in a direction so that the wax material collects on portions of the peaks and thus forms what might be termed small protective areas. After these protective areas have been produced, then a metallic evaporation step is added, this being in such direction as to coat both the protected areas and the various crevices with a metallic layer. Thereafter dissolution of the waxy material will remove the metal that has collected thereon, leaving only metallic areas in the crevices or valleys. As a final step, the application of metallic electrodes to the adsorbing element thus formed is undertaken, this being by way of evaporating metal through an appropriately configured mask.

Another object of the invention is to provide a method of making a humidity sensing element less porous as to its surface and controlling the amount of porosity reduction to such an extent that the resistance range in which the humidity sensing element will function during operation is lowered for improved instrumentation.

Other objects will be in part obvious, and in part pointed out more in detail hereinafter.

The invention accordingly consists in the features of construction, combination of elements and arrangement of parts which will be exemplified in the construction hereafter set forth and the scope of the application which will be indicated in the appended claims.

In the drawings,

Figure 1 is a perspective view partly broken away showing suitable apparatus for carrying out the improved method or process embodying my invention;

Fig. 2 is an enlarged sectional view showing the relative disposition of the adsorber plate and the evaporating boat in which is contained a protective substance, the view being before rotation of the adsorber plate;

Fig. 3 is a view similar to Fig. 2 but showing the adsorber plate after it has been rotated through 180°;

Fig. 4 is a view resembling somewhat the views set forth in Figs. 2 and 3 but instead of the boat which is used in the earlier views for evaporating the protective material onto the adsorber plate, this instant view involves the evaporation of a metallic layer which overlies the previously applied protective material as well as the unprotected areas;

Fig. 5 illustrates the completion of a further procedural step involving the removal of the protective material, thereby leaving desired metallic areas within the crevices;

Figure 6:
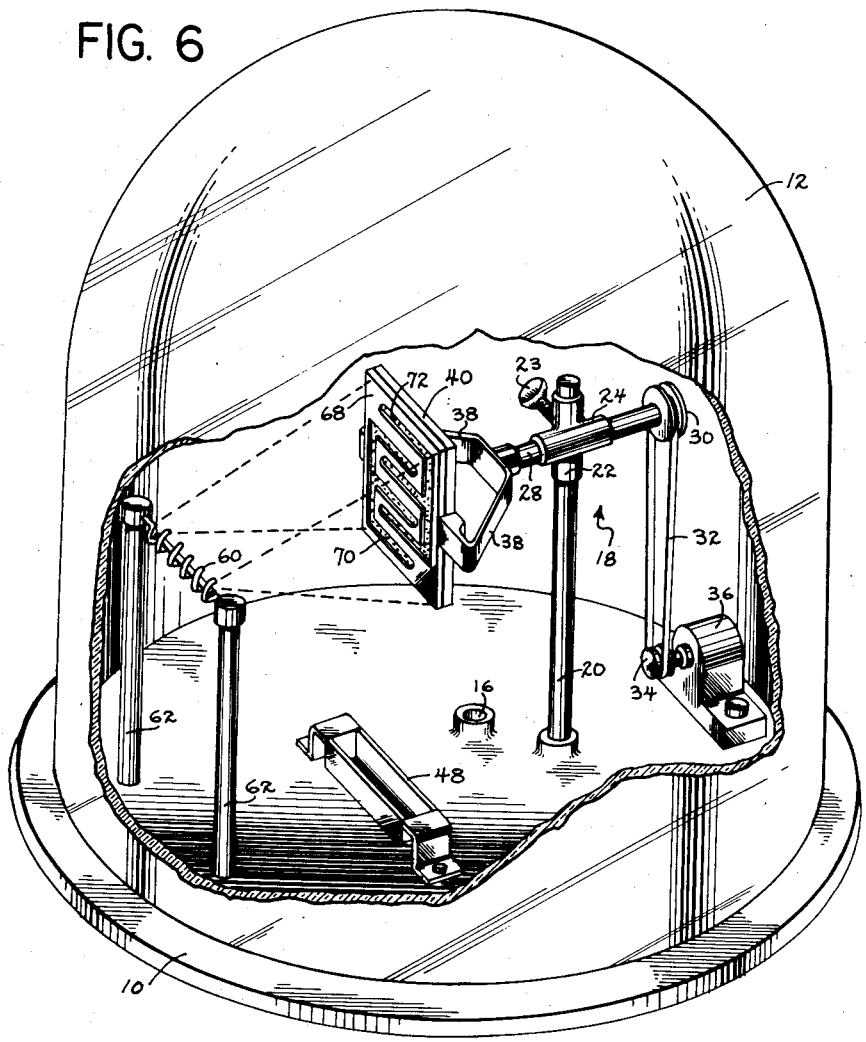
Fig. 6 is a perspective view resembling Fig. 1 but showing the interpositioning of a grid producing mask between the sources of metallic material and the adsorber plate.
Figure 7:
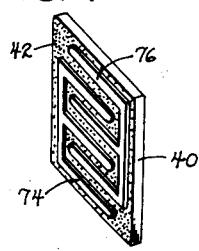
Fig. 7 is a perspective view of the completed sensor.

Referring in detail to the drawings, there is set forth certain apparatus by which the method presently to be described may be practiced. In Fig. 1 suitable apparatus for carrying out the objects of the invention suggestively includes a supporting base 10 upon which is mounted a housing 12. The housing 12 may assume a variety of configurations but in the present instance has been shown as taking the form of a bell-jar or semispherical top and a bottom open end which is adapted to rest upon the top face of the supporting base 10 in an airtight manner. For the purpose of evacuating air from the housing 12 there is provided a nipple or opening 16 to which an exhaust pump (not shown) is attached. Within the housing 12 is a stand or fixture 18 comprising an upright rod 20 upon which is mounted a vertically slidable collar 22, there being a set screw 23 by which the collar can be retained at a preferentially adjusted elevation. Integral with the collar 22 so as to be movable in unison therewith is a sleeve bearing 24 having a rotatable shaft 28 journalled therein. To one end of this shaft 28 is secured a pulley 30 and trained over this pulley is a belt or cord 32 driven by another pulley 34 mounted on the shaft of a small electric motor 36. Suitable electrical connections for the motor extend through the base 10 but these are not deemed essential for comprehension of the present invention.

At the end of the shaft 28 is a clamping device including a strip of spring metal in the form of a pair of gripping fingers 38. These gripping fingers are easily spread apart to such an extent that they can readily accommodate therebetween a plate 40 which we may assume for the sake of discussion to be a plate of porous high silica-content glass. This plate 40 has been previously roughened, either by etching or fine grinding (including sand blasting) for a purpose presently to be made manifest. The etching procedure may be preformed in a number of ways including the exposing of the face 42 on the plate 40 to fluoboric acid fumes, and if fine grinding is desired, such action may be accomplished by employing #500 or finer grit. The grinding operation for the purpose of carrying out the instant invention is performed in a random fashion.

In order to appreciate the facile configuration that results from the above-described roughening action, whether by etching or grinding, attention is now called to Fig. 2 where a greatly magnified cross section of the plate 40 is depicted. From this figure it can be perceived that the profile of the surface is highly irregular and jagged, being formed of numerous peaks 44 and crevices 46. While it is with respect to the coating of the crevices 46 that we will ultimately be concerned, nonetheless the treatment of the peaks 44 is at this moment most important. In treating the peaks 44 a shadow casting operation is performed. To this end a boat or crucible 48 is suspended between two vertical posts 50 and by means of suitable electrical connections (not visible) which pass upwardly through these posts, the boat 48 may be heated to a high temperature by resistance action. Of course, other methods of heating may be employed, depending upon the particular circumstances and the equipment available.

The distinct feature to be noted and appreciated at this point is that the boat 48 is located slightly forward of the plate 40 and at a considerable distance therebelow. As best viewed in Fig. 2, the boat forms an acute angle of about 10° with respect to the roughened face 42 of the plate 40. Owing to the specific disposition of the boat 48, many of the peaks 44 provide a shielding action for the crevices or valleys 46 on the far side thereof. Stated somewhat differently, the peaks 44 cast a certain number of shadows and it is by reason of these shadows that certain portions of the crevices will remain uncoated by the protective or masking material presently to be applied by evaporation and which will now be described.

Concerning the application of the protective or masking material, it can be explained that such material may be in the form of a wax such as $KH_2PO_4$ which is readily soluble in water or any other solvent which may be found appropriate for the particular composition. Of course in selecting the type of solvent, care should be taken that no damage or contamination of the sensor will ensue. When the wax material 52 is heated by heat transferred from the boat 48, wax particles of molecular dimensions will emanate from the boat and will travel in straight lines in all directions. Since we are only interested in those particles which traverse a path toward the plate 40, the travel of these particles has been designated by a plurality of dashed lines 54. From Fig. 2 it can be seen that the height of a number of the peaks 44 is sufficient so as to shield their far sides from the waxy material. Such shielding, of course, prevents the waxy material from collecting on these far sides and it is only the sides of the peaks facing the boat 48 that receive a wax coating. The angle at which the minute wax particles strike the plate 40 is at approximately 10° as can be best observed from Fig. 2.

Although in Fig. 2 the waxed areas are all on the underside of the peaks, nonetheless it is within the contemplation of the invention to control the area that receives this wax material. With this in mind, it will be remembered that structure 18 has been previously described, which is instrumental in turning or rotating the plate 40 through a preferred angle. For instance, if the angle is 180°, the plate will be turned completely upside down and will appear as seen in Fig. 3. All the while the plate is being rotated, the various portions of the peaks 44 facing the boat 48 will receive a covering of wax from the source 52. This covering is visible to a greater extent in Fig. 3 but since Fig. 3 represents only one position arrived at during the turning, it is, of course, not completely symbolic of the total area receiving the wax treatment. At any rate, from Fig. 3, it will be appreciated that more area has been exposed to the wax than would be the situation with only the one position depicted in Fig. 2, interruptions occurring only when there is shielding from another peak.

After having received the coating of wax in the form of the discrete areas, which will be given the reference numeral 56 in Fig. 2 and 58 in Fig. 3, the plate or element 40 is then ready for a coating of metal. Accordingly, attention is now redirected to Fig. 1 and in this figure, it will be noted that a coiled filament 60 containing a noble metal is mounted to upstanding posts 62, the filament 60 receiving energization via conductors leading upwardly through these posts 62. One thing to be particularly made plain is that the filament 60 by virtue of the height of the post is at an elevation approximating the center of the plate 40. Hence it is believed obvious that metal evaporated from the filament 60 will proceed in a direction substantially normal to the general plane of the plate 40, as indicated by the dotted lines 63 in Fig. 4, striking this plate so that both the peaks 44 and the crevices 46 receive what is substantially a continuous or uninterrupted layer 64 of metal.

What is desired, however, is that the crevices 46 remain coated with metal and that the metal that has impinged against the peaks 44 be removed. This is the aiding function of the wax material 52 and as already pointed out, this material may be readily dissolved. Any particular procedure may be selected for dissolving the wax 52, in this situation the particular wax selected being easily dissolved by the mere application of water thereto, there being a certain porosity in the metal film above.

Having dissolved the wax that has appeared on the peaks 44 in the form of the areas labelled 56 and 58, the metal that has adhered by evaporation to these areas is likewise removed, leaving these portions of the peaks barren of any metal. However, the metal that has collected in the crevices is not removed since these crevices have not received any of the wax 52. Consequently, the crevices remain coated wtih metal and these metallic areas, to distinguish from the metallic layer 64, have been designated collectively by the reference numeral 66 as can be observed from Fig. 5. By virtue of the lack of generalized porosity of the metallic area 66, it can well be appreciated that access to the porous material of which the plate 40 is made is appreciably lessened. What access remains in the peaks is by means of a multiplicity of connected pores opening to the surface such that both desorption and adsorption are quickened through faster diffusion rates. As hereinbefore indicated, such materials may be selected from the group consisting of unglazed porcelain, fired glass, and what is commonly termed "thirsty" glass.

As yet the plate 40 is not in a form which is suitable for making humidity measurements. What has had to be done is to apply metallic grids to the face 42. This step is illustrated in Fig. 6 where a suitably configured mask 68 is depicted having openings 70 and 72 in the form of parallel sections extending longitudinally and transverse finger sections extending horizontally, the mask 68 being held against the element 40. These openings permit metal evaporated from within the filament coil 60 to strike the face 42 leaving metallic grids 74 and 76 (Fig. 6) corresponding in shape to said openings 70 and 72. It will be observed that these grids 74 and 76 are electrically distinct from each other, the inwardly projecting fingers being merely interleaved between each other without actually making contact. By reason of this arrangement, the accumulation of moisture on the element will literally bridge the separated areas and affect the over-all resistance of the humidity sensor. Of course, the presence of the metallic areas 66 not only tends to clog some portion of the plate 40 but also provides an interrupted electrical path of relatively low resistivity, with the particles of moisture completing this path. It is the presence or absence of the intervening particles of moisture that determines the over-all resistance of the element, there being more moisture present when there is a high humidity than when there is a lower humidity.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

What is claimed:

1. A method of making a humidity sensor comprising the steps of shadow casting a non-permanent substance onto a roughened surface of an inert element, the direction of shadow casting being at an acute angle with the general plane of said surface so that portions of the higher regions are coated, applying a layer of noble metal over both the coated and uncoated regions, and removing said substance together with the metal overlying said substance so that only metallic areas remain on the lower regions of said roughened surface.

2. A method of making a humidity sensor comprising the steps of shadow casting a protective material onto a roughened surface of an adsorbing element having a multiplicity of peaks and crevices, the direction of shadow casting being at an acute angle with the general plane of said surface so that portions of said peaks receive said protective material, evaporating a layer of noble metal over both said peaks and crevices, and dissolving said protective material so as to remove the evaporated metal from said peaks.

3. A method in accordance with claim 2 in which said protective material is a wax and said metal is a noble metal.

4. A method of making a humidity sensor comprising the steps of roughening one face of an adsorbing element to form a multiplicity of peaks and crevices thereon, evaporating a dissolvable masking material from a source disposed at an acute angle to the general plane of said face so that portions of said peaks receive said masking material in the form of small separated areas, evaporating a layer of metal from a source disposed substantially in front of said element so that a metallic layer is formed which extends over said peaks and crevices, dissolving said masking material so as to remove the evaporated metal from said peaks, and applying interleaved metallic grids to the roughened face after removal of said masking material.

5. A method in accordance with claim 4 including the steps of rotating said element during the application of said masking material.

References Cited in the file of this patent

UNITED STATES PATENTS

| | | |
|---|---|---|
| 1,767,715 | Stoekle | June 24, 1930 |
| 2,061,106 | Schellenger | Nov. 17, 1936 |
| 2,061,107 | Schellenger | Nov. 17, 1936 |
| 2,075,377 | Varian | Mar. 30, 1937 |
| 2,139,640 | Mall et al. | Dec. 6, 1938 |
| 2,160,981 | O'Brien | June 6, 1939 |
| 2,351,536 | Osterberg et al. | June 13, 1944 |
| 2,412,201 | Brennan | Dec. 10, 1946 |
| 2,516,986 | Heinse | Aug. 1, 1950 |
| 2,543,384 | Squier | Feb. 27, 1951 |
| 2,613,302 | Gurewitsch | Oct. 7, 1952 |
| 2,644,208 | Auphan | July 7, 1953 |
| 2,719,097 | Auwarter | Sept. 25, 1955 |
| 2,860,221 | Kohl | Nov. 11, 1958 |